United States Patent
Bengtsson

(10) Patent No.: US 10,826,579 B2
(45) Date of Patent: Nov. 3, 2020

(54) TIME REVERSE TRANSMISSION MODE

(71) Applicant: Sony Corporation, Tokyo (JP)

(72) Inventor: Erik Bengtsson, Eslov (SE)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 16/488,773

(22) PCT Filed: Mar. 27, 2017

(86) PCT No.: PCT/IB2017/051740
§ 371 (c)(1),
(2) Date: Aug. 26, 2019

(87) PCT Pub. No.: WO2018/178741
PCT Pub. Date: Oct. 4, 2018

(65) Prior Publication Data
US 2020/0067572 A1    Feb. 27, 2020

(51) Int. Cl.
*H04B 7/0456* (2017.01)
*H04L 25/02* (2006.01)
*H04L 25/03* (2006.01)

(52) U.S. Cl.
CPC ......... *H04B 7/046* (2013.01); *H04L 25/0204* (2013.01); *H04L 25/0224* (2013.01); *H04L 25/03343* (2013.01)

(58) Field of Classification Search
CPC . H04B 7/046; H04L 25/0204; H04L 25/0224; H04L 25/03343; H04L 25/0398

USPC .................. 375/259, 267; 340/10.5
See application file for complete search history.

(56) References Cited

U.S. PATENT DOCUMENTS

| 8,743,976 B2* | 6/2014 | Smith | H04L 25/0212 |
| | | | 375/259 |
| 8,922,350 B2* | 12/2014 | Griffin | H04B 5/0056 |
| | | | 340/10.5 |
| 2015/0173034 A1 | 6/2015 | Rode et al. | |

FOREIGN PATENT DOCUMENTS

WO    2016137898 A1    9/2016

OTHER PUBLICATIONS

International Search Report and Written Opinion dated Oct. 4, 2018 issued in PCT/IB2017/051740.

* cited by examiner

*Primary Examiner* — Fitwi Y Hailegiorgis
(74) *Attorney, Agent, or Firm* — Renner, Otto, Boisselle & Sklar, LLP

(57) ABSTRACT

A method, system, or transmitting device including at least two antennas (e.g., orthogonally polarized antennas) that derives the precoding for each of the at least two antennas. The transmission signal provided to each antenna is based on an individual precoder for each antenna that is based on the signals received by the particular antenna.

15 Claims, 5 Drawing Sheets

FIG. 3B

Pilot Signal 30
(as received by transmitting device)

Precoded Transmission Signal 32
(as transmitted by transmitting device)

Precoded Transmission Signal 32
(as received by receiving device)

Pilot signal transmitted by the receiving device

Pilot signal received by the transmitting device

Transmitted precoded signal
(time aligned and reversed)

TIME REVERSE TRANSMISSION MODE

RELATED APPLICATIONS

This application is a national phase entry of International Application No. PCT/IB2017/051740 filed on Mar. 27, 2017 and published in the English language, which is hereby incorporated by reference.

TECHNICAL FIELD

The present disclosure relates generally to wireless communications and more particularly to a method and device for encoding wireless communications.

BACKGROUND

Different methods have been developed to optimize the performance of cellular communications and to improve spectral efficiency. Most such approaches relate to more efficient utilization of spatial properties. One approach is multiple-input and multiple-output (MIMO), where the number of antennas is increased. Massive MIMO is an extreme example of a system where the number of antennas at one side has been increased to approximately 100.

Another approach is to use time reversed transmission. In time reversed transmission, a receive channel with a large bandwidth may be used that enables very accurate reception of a pilot signal (a signal having known properties) in the time domain (time resolution is reversely proportional to the bandwidth). The time response is reversed and used as precoding of a transmitted signal. Time reversed transmission improves signal-to-noise ratio at the receiver of the above mentioned precoded and transmitted signal, which indirectly improves the interference ratio and a hardening effect like in massive MIMO can be achieved.

Compared to massive MIMO, time reversed transmission does not have the same energy efficiency, because the signal is transmitted omni-directionally and the array gain is lost. This will also impact the interference level and potential spectral efficiency.

SUMMARY

A limitation of time reversed transmission as described by prior art is that it wastes much of the signal energy. Time reversed transmission addresses each resolved multi path component with a signal that coherently adds up at the receiver. However, by nature, different multi path components are not co-polarized, as the polarization changes depending on the geometry of the environment. A problem with prior art time reversed transmission is that it only addresses a single polarization, which wastes much of the signal energy. This is especially true for multiple propagation paths, which tend to have different polarizations.

The present disclosure uses a transmitting device including at least two antennas, e.g., orthogonally polarized antennas, and derives the precoding for each of the at least two antennas. The transmission signal provided to each antenna is based on an individual precoder for each antenna that is based on the signals received by the particular antenna. Precoding the transmission signals modifies the timing that different portions of the transmission signals are transmitted, such that the time variations are compensated for and the multiple propagation paths add constructively at one time instant at a point in space (e.g., at the antenna of the receiving device). This constructive addition provides gain and also reduces or removes signal variation normally caused by cancelation effects (small scale fading).

The present disclosure provides a method of encoding wireless communication signals by performing time reversed transmission using at least two antennas. The method may be used as an operational mode for device to device communication and/or in any form of communication, e.g., where there is insufficient space for a massive antenna array (e.g., home, office, or indoor).

According to one aspect, there is provided a method for encoding wireless communications signals, the method includes receiving a first signal by receiving a pilot signal with a first antenna and receiving a second signal by receiving the pilot signal with a second antenna. The pilot signal includes a range of frequencies and an initial signal having known properties prior to being transmitted. The method also includes calculating a first precoding transform based on the first signal and a measured first phase for the first signal over the range of frequencies of the pilot signal. The method additionally includes calculating a second precoding transform based on the second signal and a measured second phase for the second signal over the range of frequencies of the pilot signal. The method further includes generating a first precoded transmission signal by applying the first precoding transform to a transmission signal and generating a second precoded transmission signal by applying the second precoding transform to the transmission signal. The method also includes transmitting the first precoded transmission signal from the first antenna and transmitting the second precoded transmission signal from the second antenna. The first precoded transmission signal is transmitted with a phase which is offset to a phase of the second precoded transmission signal by a phase difference between the second phase and the first phase.

Alternatively or additionally, the first and second precoding transforms are calculated such that the first and second precoded transmission signals over the range of frequencies of the pilot signal are transmitted in time in a reverse of an order in which the same frequencies of the pilot signal were received, respectively.

Alternatively or additionally, the first and second precoding transforms are calculated using a reverse of a timing that the first signal and the second signal over the range of frequencies of the pilot signal are received.

Alternatively or additionally, a time delay between a transmission of specific frequencies of the precoded transmission signal corresponds to a time delay between the same specific frequencies of the received pilot signal.

Alternatively or additionally, a polarization of the first antenna is essentially orthogonally polarized relative to a polarization of the second antenna.

Alternatively or additionally, the method further includes receiving a third signal by receiving the pilot signal with a third antenna, calculating a third precoding transform based on the third signal and a measured third phase for the third signal over the range of frequencies of the pilot signal, generating a third precoded transmission signal by applying the third precoding transform to the transmission signal, and transmitting the third precoded transmission signal from the third antenna. The third precoded transmission signal is transmitted with a phase which is offset to a phase of the first precoded transmission signal by a negative phase difference between the third phase and the first phase and the phase of the second precoded transmission signal by a negative phase difference between the third phase and the second phase.

Alternatively or additionally, the pilot signal comprises an approximated signal shape of a known signal shape, the method further comprising determining the approximated signal shape based on available bandwidth for the pilot signal, wherein the available bandwidth is not contiguous.

Alternatively or additionally, the method further comprising determining which of the first signal and the second signal are a stronger signal. The stronger signal is the first signal, transmitting a sounding signal by the first antenna. When the stronger signal is the second signal, the method includes transmitting the sounding signal by the second antenna. The method also includes receiving the transmitted sounding signal with an antenna of a receiving device, calculating a broadcast precoding transform based on the sounding signal received with the antenna of the receiving device and a measured phase for the sounding signal over the range of frequencies of the sounding signal, generating a precoded broadcast signal by applying the broadcast precoding transform to a broadcast signal, and transmitting the precoded broadcast signal from the antenna of the receiving device.

Alternatively or additionally, the method further comprises identifying a strongest signal contribution of the received pilot signal and a timing of the strongest signal contribution and determining a sounding signal ratio comprising a ratio between an amplitude of the first signal and an amplitude of the second signal at the timing of the strongest signal contribution. The method also includes generating a first sounding signal and a second sounding signal such that a ratio between an amplitude of the first sounding signal and an amplitude of the second sounding signal corresponds to the determined sounding signal ratio and a phase of the first sounding signal is offset to a phase of the second sounding signal by a negative phase difference between the first signal and the second signal at the timing of the strongest signal contribution. The method additionally includes transmitting the first sounding signal using the first antenna and transmitting the second sounding signal using the second antenna.

According to another aspect, there is provided a transmitting device configured to transmit encoded wireless communications signals. The transmitting device includes a first antenna configured to receive a first signal by receiving a pilot signal and a second antenna configured to receive a second signal by receiving the pilot signal. The pilot signal comprises a range of frequencies and an initial signal having known properties prior to being transmitted. The transmitting device includes circuitry configured to calculate a first precoding transform based on the first signal and a measured first phase for the first signal over the range of frequencies of the pilot signal and calculate a second precoding transform based on the second signal and a measured second phase for the second signal over the range of frequencies of the pilot signal. The circuitry is also configured to generate a first precoded transmission signal by applying the first precoding transform to a transmission signal and generate a second precoded transmission signal by applying the second precoding transform to the transmission signal. The circuitry is additionally configured to cause the first antenna to transmit the first precoded transmission signal and cause the second antenna to transmit the second precoded transmission signal. The first precoded transmission signal is transmitted with a phase which is offset to a phase of the second precoded transmission signal by a phase difference between the second phase and the first phase.

Alternatively or additionally, the first and second precoding transforms are calculated such that the first and second precoded transmission signals over the range of frequencies of the pilot signal are transmitted in time in a reverse of an order in which the same frequencies of the pilot signal were received, respectively.

Alternatively or additionally, the first and second precoding transforms are calculated using a reverse of a timing that the first signal and the second signal over the range of frequencies of the pilot signal are received.

Alternatively or additionally, a time delay between a transmission of specific frequencies of the precoded transmission signal corresponds to a time delay between the same specific frequencies of the received pilot signal.

Alternatively or additionally, a polarization of the first antenna is essentially orthogonally polarized relative to a polarization of the second antenna.

Alternatively or additionally, the transmitting device also includes a third antenna configured to receive a third signal by receiving the pilot signal. The circuitry is further configured to calculate a third precoding transform based on the third signal and a measured third phase for the third signal over the range of frequencies of the pilot signal, generate a third precoded transmission signal by applying the third precoding transform to the transmission signal, and cause the third antenna to transmit the third precoded transmission signal. The third precoded transmission signal is transmitted with a phase which is offset to a phase of the first precoded transmission signal by a negative phase difference between the third phase and the first phase and the phase of the second precoded transmission signal by a negative phase difference between the third phase and the second phase.

A number of features are described herein with respect to embodiments of the invention; it will be appreciated that features described with respect to a given embodiment also may be employed in connection with other embodiments.

The following description and the annexed drawings set forth certain illustrative embodiments of the invention. These embodiments are indicative, however, of but a few of the various ways in which the principles of the invention may be employed. Other objects, advantages and novel features according to aspects of the invention will become apparent from the following detailed description when considered in conjunction with the drawings.

BRIEF DESCRIPTION OF THE DRAWINGS

The annexed drawings, which are not necessarily to scale, show various aspects of the invention in which similar reference numerals are used to indicate the same or similar parts in the various views.

DETAILED DESCRIPTION

When a wireless pilot signal is transmitted, the signal will be received with a time delay between different parts of the transmitted pilot signal. The delay between the different part of the transmitted pilot signal are due to different propagation paths through space taken by different parts of the transmitted pilot signal. A return signal can be precoded and transmitted. Precoding the return signal modifies the timing that different portions of the return signal are transmitted, such that the time variations are compensated for and the multiple propagation paths add constructively at one time instant at a point in space (e.g., at the antenna of the receiving device). This constructive addition provides gain and may, e.g., only occur at the position from where the pilot signal was transmitted. This also reduces or removes signal variation normally caused by cancelation effects (small scale fading).

This method of signal precoding may be used for lower frequencies, because the aperture is sufficient (i.e., the antenna size is large enough) to capture enough energy. Also, for lower frequencies (e.g., 0.5-6.0 GHz), it may be preferable to avoid large numbers of antennas, because the required distance between the antenna elements is bigger than for higher frequencies, since the distance is based on the wavelength of the signal. However, as will be understood by one of ordinary skill in the art, this method of signal precoding may be used for any frequency range. The method may also be used for both uplink, downlink, and sidelink communications between devices, base stations, etc.

Figure 1:
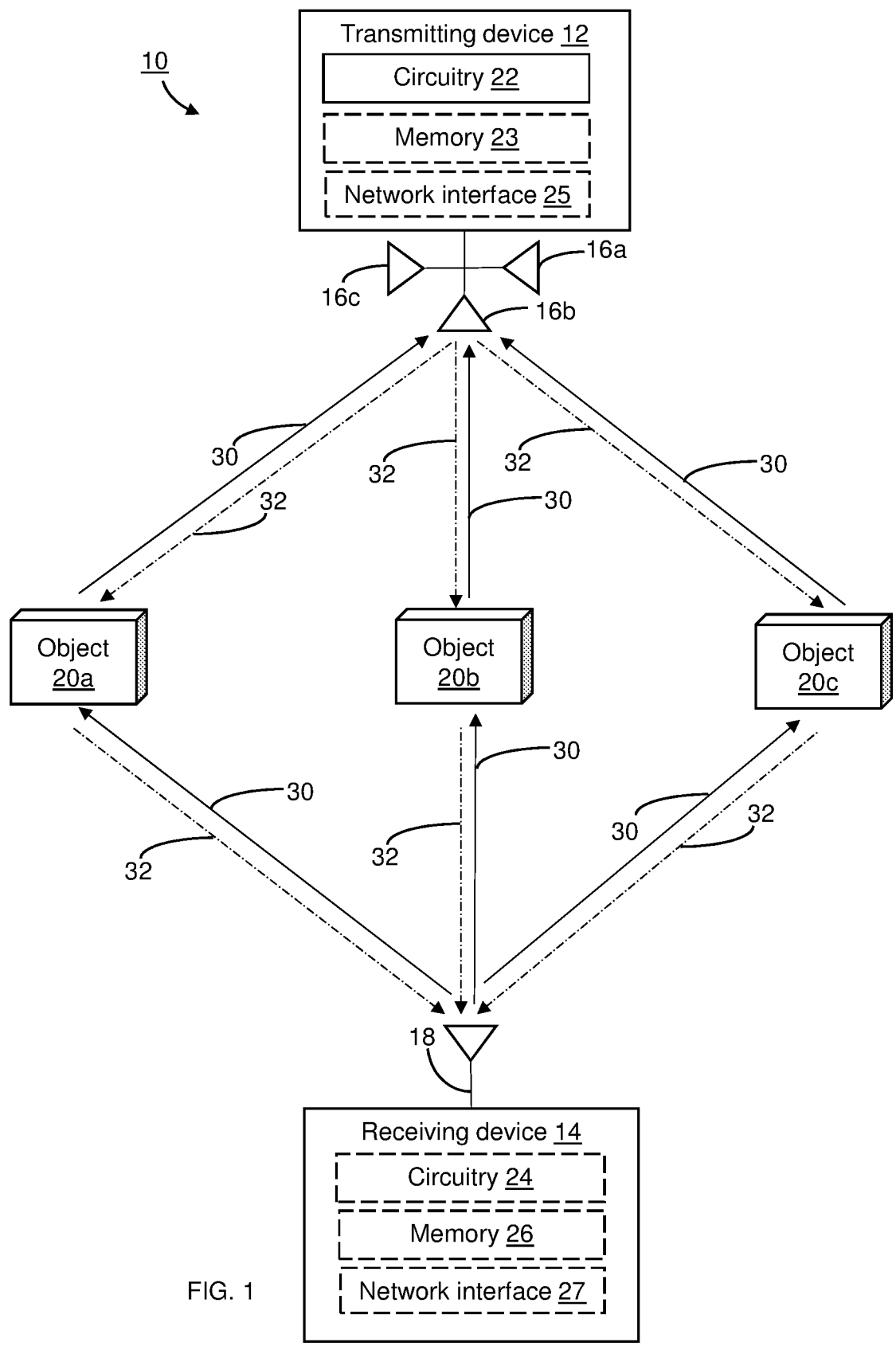
FIG. 1 is a diagram depicting transmission of wireless communication signals between a transmitting device and a receiving device.

Turning to FIG. 1, a system 10 for transmitting encoded wireless signals is shown. The system 10 includes a transmitting device 12 and a receiving device 14. The transmitting device 12 includes at least two antennas 16 and the receiving device 14 includes an antenna 18. The receiving device 14 is configured to transmit a pilot signal 30 using the antenna 18.

As shown in FIG. 1, the pilot signal 30 takes different paths (e.g., being affected by different objects 20a-c) before a portion of the pilot signal 30 is received by the at least two antennas 16 of the transmitting device 12. The pilot signal 30 includes a first signal and a second signal. A first antenna 16a of the transmitting device 12 is configured to receive the first signal by receiving the pilot signal 30. A second antenna 16b is configured to receive a second signal by receiving the pilot signal 30.

A polarization of the first antenna 16a may be essentially orthogonally polarized relative to a polarization of the second antenna 16b. As will be understood by one of ordinary skill in the art, essentially orthogonally polarized may refer to the antennas having a polarization relative to one another that is off from orthogonal by less than 5 degrees, less than 10 degrees, or less than 15 degrees. Alternatively, essentially orthogonally polarized may refer to the first antenna 16a being orthogonally polarized relative to the polarization of the second antenna 16b. The at least two antennas 16 of the transmitting device 12 may be linearly polarized and/or circularly polarized.

Figure 2A:
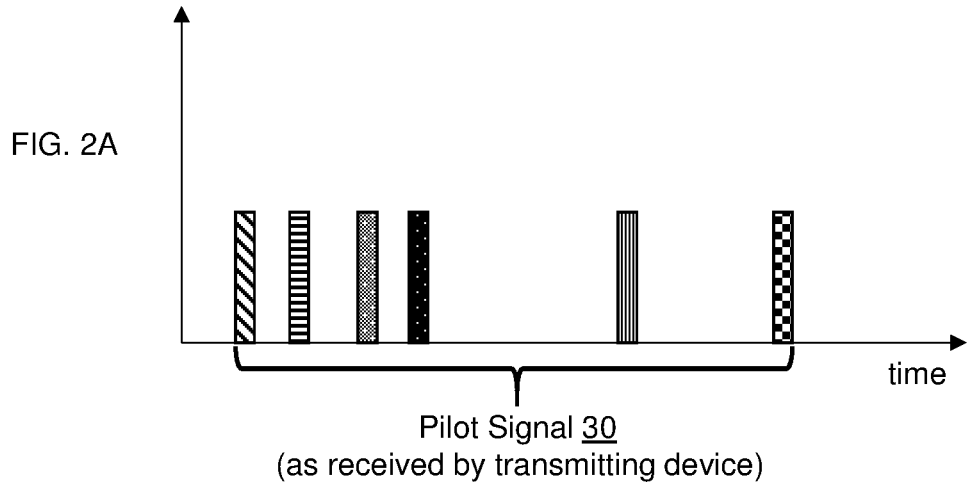
FIG. 2A is a diagram depicting a pilot signal.

Turning to FIG. 2A, an exemplary pilot signal 30 received by the transmitting device 12 is shown. The pilot signal 30 includes a range of frequencies and an initial signal having known properties prior to being transmitted. The properties of the pilot signal 30 are known by both the transmitting device 12 and the receiving device 14. For example, the pilot signal may comprise an approximated signal shape of a known signal shape. The approximated signal shape may be determined based on available bandwidth for the pilot signal 30. The signal shape of the pilot signal may be affected while propagating through the environment before being received by the transmitting device 12. For this reason, the pilot signal 30 received by the transmitting device 12 may differ from the pilot signal 30 when transmitted by the receiving device 14. For example, the pilot signal shown in FIG. 2A was transmitted as an approximation of a square wave. However, due to different propagation paths, different components of the pilot signal 30 may be received at different times.

The transmitting device 12 includes circuitry 22 configured to perform a number of functions. The circuitry 22 is described below based on the performed function (e.g., determining circuitry 22a). The different forms of circuitry 22 described below may be performed by the same circuitry (e.g., the same processor) or using different circuitry (e.g., at least two different processors). As described below, the operations performed by the circuitry may be determined by computer instructions stored in non-transitory computer readable medium 23.

The determining circuitry 22a includes determining circuitry 22a configured to determine an impulse response of communication between the transmitting device 12 and the receiving device 14. That is, the determining circuitry 22a is configured to calculate a first precoding transform based on the first signal and a measured first phase for the first signal over the range of frequencies of the pilot signal 30. The circuitry is also configured to calculate a second precoding transform based on the second signal and a measured second phase for the second signal over the range of frequencies of the pilot signal 30.

Figure 2B:
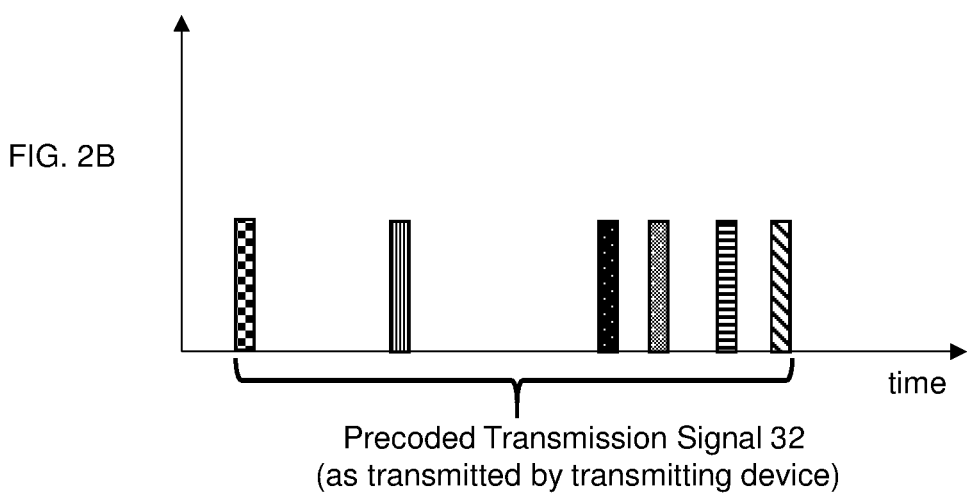
FIG. 2B is a diagram depicting a precoded transmission signal as transmitted.

Turning to FIG. 2B, an exemplary precoded transmission signal 32 is shown. The circuitry generates a first precoded transmission signal 32a by applying the first precoding transform to a transmission signal. The circuitry also generates a second precoded transmission signal 32b by applying the second precoding transform to the transmission signal. The precoded transmission signal 32 may comprise the combination of the first precoded transmission signal 32a and the second precoded transmission signal 32b.

As will be understood by one of ordinary skill in the art, the transmission signal may comprise any signal that is to be received by the receiving device 14. For example, the transmission signal may include a first transmission signal and a second transmission signal. The first transmission signal may be associated with the first antenna 16a. The second transmission signal may be associated with the second antenna 16b.

The transmission signal may comprises a range of frequencies and the precoded transmission signal may comprises a same range of frequencies as the transmission signal.

The first and second precoding transforms may be calculated such that the first and second precoded transmission signals 32 over the range of frequencies of the pilot signal 30 are transmitted in time in a reverse of an order in which the same frequencies of the pilot signal 30 were received, respectively. For example, as shown in FIGS. 2B and 2C, the first and second precoding transforms may be calculated using a reverse of a timing that the first signal and the second signal over the range of frequencies of the pilot signal 30 are received.

Figure 2C:
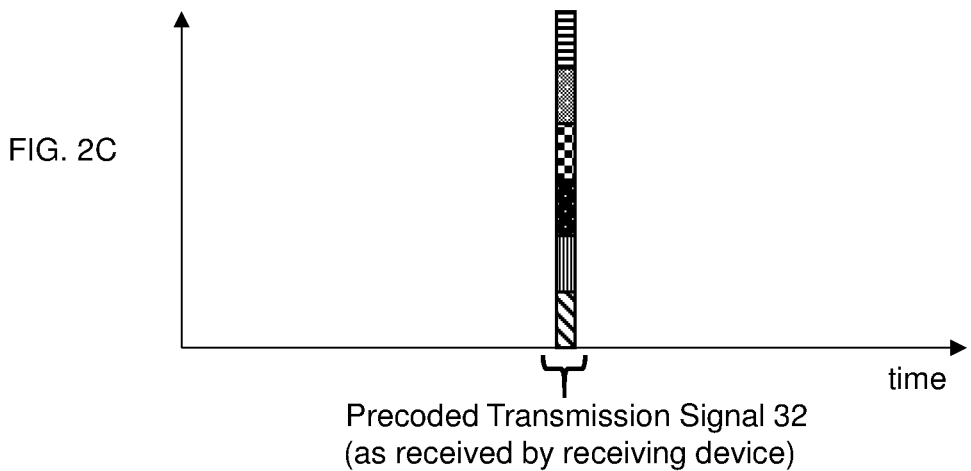
FIG. 2C is a diagram depicting the precoded transmission signal as received.

With continued reference to FIGS. 2B and 2C, a time delay between a transmission of specific frequencies (represented by the textured bars) of the precoded transmission signal may correspond to a time delay between the same specific frequencies of the received pilot signal 30.

The transmitting device 12 is configured to transmit encoded wireless communications signals. The circuitry causes the first antenna 16 to transmit the first precoded transmission signal 32a and causes the second antenna 16 to transmit the second precoded transmission signal 32b. The first precoded transmission signal 32a is transmitted with a phase which is offset to a phase of the second precoded transmission signal 32b by a phase difference between the second phase (i.e., the phase of the second signal) and the first phase (i.e., the phase of the first signal). The phase of the first precoded transmission signal 32a may be determined using the following equation:

$$\varphi_{T1}-\varphi_{T2}=\varphi_2-\varphi_1$$

where $\varphi_{T1}$ represents the phase of the first precoded transmission signal, $\varphi_{T2}$ represents the phase of the second precoded transmission signal, $\varphi_1$ represents the first phase, and $\varphi_2$ represents the second phase.

For example, if the first phase is +30 degrees relative to the second phase, then the first precoded transmission signal 32a is transmitted with a phase that is −30 degrees relative to the phase of the second precoded transmission signal 32b.

As shown in FIG. 2C, while the precoded transmission signal 32 may be transmitted with a time delay between different portions of the signal (FIG. 2B), the precoded transmission signal 32 may be received at approximately the same time instant when received by the receiving device 14. That is, the first and second precoded transmission signals may be generated by applying the first and second precoding transforms to a transmission signal such that, when transmitted by the at least two polarized antennas 16 of the transmitting device 12, the precoded transmission signal achieves coherent and polarization matched summation of signals from different propagation paths at the antenna 18 of the receiving device 14 (e.g., polarizations aligned with the antenna 18 of the receiving device 14).

The transmitting device 12 may include a third antenna 16c configured to receive a third signal by receiving the pilot signal 30. For example, the third antenna 16c may be essentially orthogonally polarized relative to the first antenna 16a and the second antenna 16b. When including a third antenna 16c, the circuitry may be further configured to calculate a third precoding transform based on the third signal and a measured third phase for the third signal over the range of frequencies of the pilot signal 30.

The circuitry 22 may also include generating circuitry 22b. The generating circuitry 22b may be configured to generate a third precoded transmission signal 32 by applying the third precoding transform to the transmission signal and cause the third antenna 16 to transmit the third precoded transmission signal 32. The third precoded transmission signal 32 may be transmitted with a phase which is offset to both (1) a phase of the first precoded transmission signal by a negative phase difference between the third phase (i.e., the phase of the third signal) and the first phase and (2) the phase of the second precoded transmission signal by a negative phase difference between the third phase and the second phase. For example, the phase of the third precoded transmission signal may be described by the following equations:

$$\varphi_{T3}-\varphi_{T1}=\varphi_1-\varphi_3$$

$$\varphi_{T3}-\varphi_{T2}=\varphi_2-\varphi_3$$

where $\varphi_{T1}$ represents the phase of the first precoded transmission signal, $\varphi_{T2}$ represents the phase of the second precoded transmission signal, $\varphi_{T3}$ represents the phase of the third precoded transmission signal, $\varphi_1$ represents the first phase, $\varphi_2$ represents the second phase, and $\varphi_3$ represents the third phase.

Figure 3A:
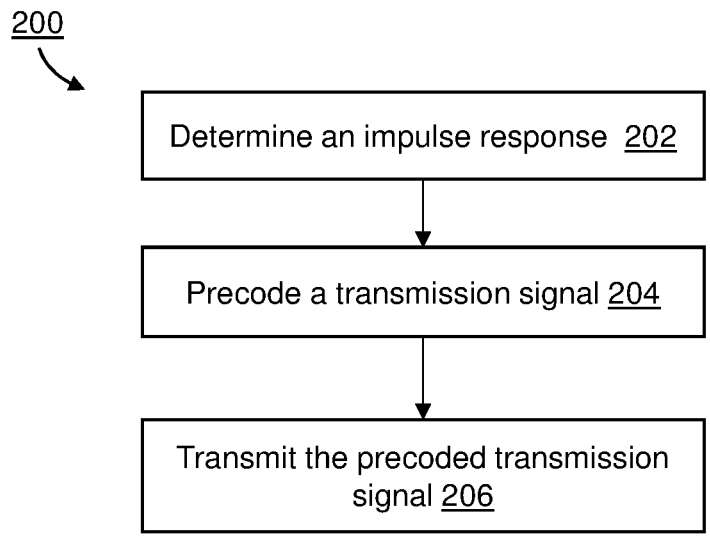
FIG. 3A is a flow diagram depicting a method for encoding wireless communications signals.

Turning to FIG. 3A, a method for 200 for encoding wireless communications signals is shown. As will be understood by one of ordinary skill in the art, the method 200 may be performed by the transmitting device 12. In process block 202, an impulse response is determined. In process block 204, a transmission signal is precoded. In process block 206, the precoded transmission signal is transmitted 206.

Figure 3B:
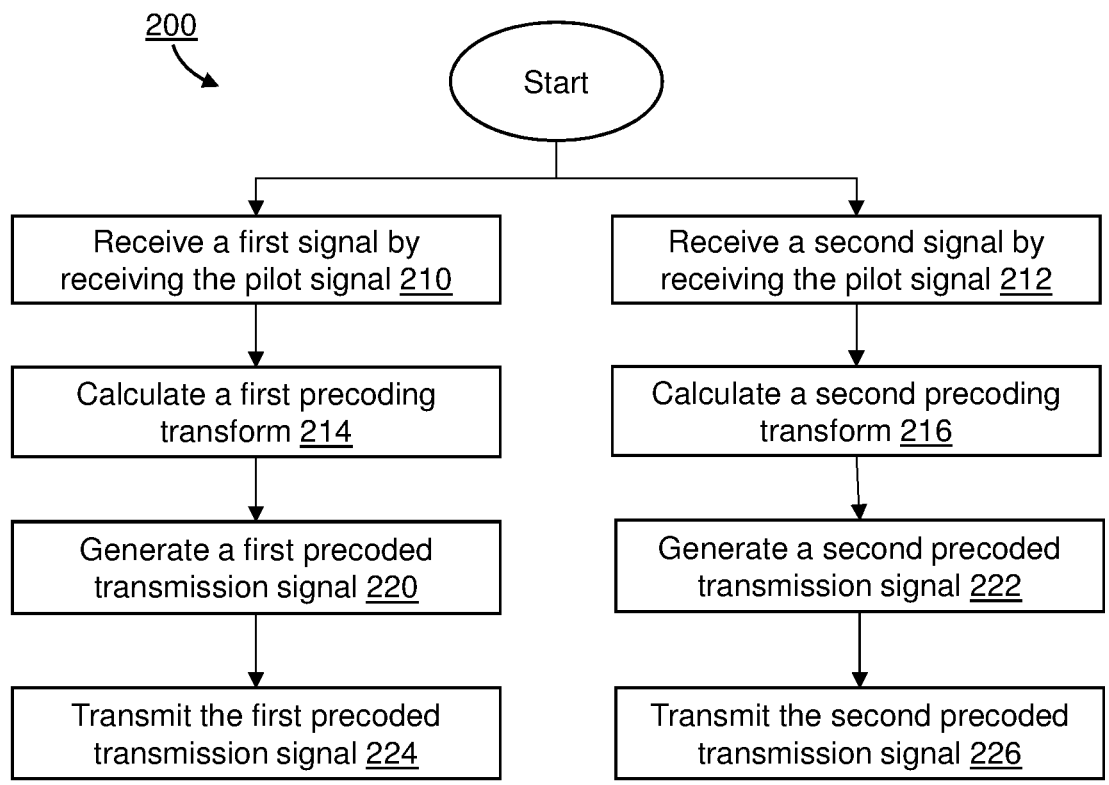
FIG. 3B is another flow diagram depicting the method for encoding wireless communications signals.

FIG. 3B shows an embodiment of the method of FIG. 4A including additional details. In FIG. 3B, the method is split into two branches. The first branch (process blocks 210, 214, 220, and 224) may be performed using the first antenna 16 and the second branch (process blocks 212, 216, 222, and 226) may be performed using the second antenna 16.

Moving along the first branch, determining the impulse response includes receiving 210 the first signal by receiving a pilot signal 30 with the first antenna 16a and calculating 214 the first precoding transform based on the first signal and a measured first phase for the first signal over the range of frequencies of the pilot signal 30. Similarly, moving along the second branch, determining the impulse response includes receiving 212 the second signal by receiving the pilot signal 30 with a second antenna 16b and calculating 216 a second precoding transform based on the second signal and a measured second phase for the second signal over the range of frequencies of the pilot signal 30.

Continuing along the first branch, the first precoded transmission signal 32aa is generated 220 by applying the first precoding transform to the transmission signal. The first precoded transmission signal 32aa is then transmitted 224 from the first antenna 16a. Similarly, along the second branch, the second precoded transmission signal 32bb is generated 222 by applying the second precoding transform to the transmission signal. The second precoded transmission signal 32bb is then transmitted 224 from the second antenna 16b. As described above, the first precoded transmission signal 32aa is transmitted with a phase which is offset to a phase of the second precoded transmission signal 32bb by a phase difference between the second phase and the first phase.

As described above, the pilot signal 30 may comprise an approximated signal shape of a known signal shape. The method may also include determining the approximated signal shape based on available bandwidth for the pilot signal 30. The bandwidth may be contiguous or not contiguous.

The method may also include receiving a third signal by receiving the pilot signal 30 with a third antenna 16c. Once received, a third precoding transform is calculated based on the third signal and a measured third phase for the third signal over the range of frequencies of the pilot signal 30. A third precoded transmission signal 32c is then generated by applying the third precoding transform to the transmission signal. The method also includes transmitting the third precoded transmission signal 32c from the third antenna.

The third precoded transmission signal 32c is transmitted with a phase which is offset to a phase of the first precoded transmission signal by a negative phase difference between the third phase and the first phase. The third precoded transmission signal 32c is also transmitted with a phase which is offset to the phase of the second precoded transmission signal by a negative phase difference between the third phase and the second phase.

Figure 4:
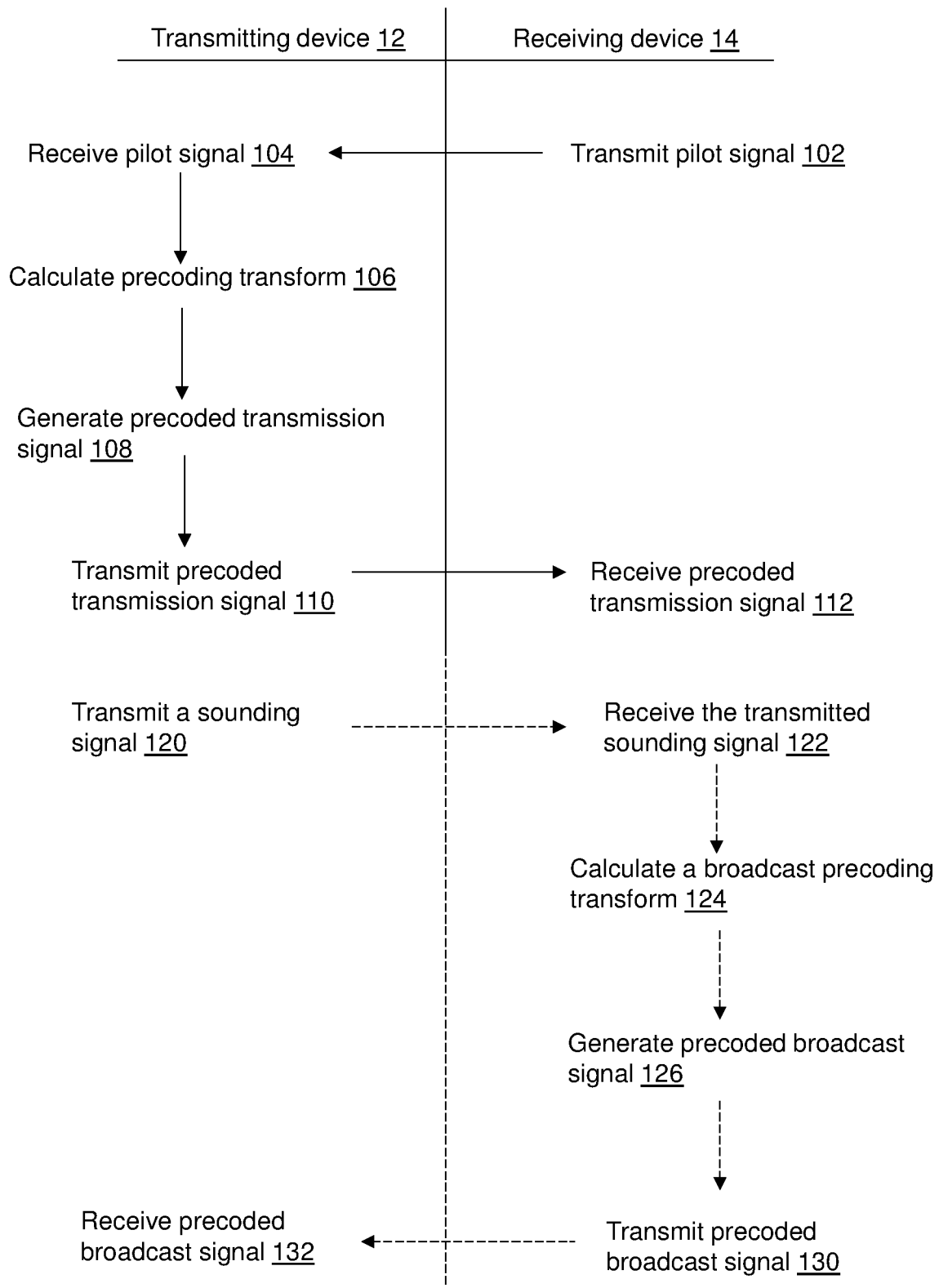
FIG. 4 is a ladder diagram depicting the transmission of wireless communication signals between a transmitting device and a receiving device.

Turning to FIG. 4, the transmission of wireless communication signals between the transmitting device 12 and the receiving device 14 are shown. As described above, the receiving device 14 transmits 102 the pilot signal 30. The transmitting device 12 receives 104 the pilot signal 30. The transmitting device 12 then calculates 106 the precoding transform and generates 108 the precoded transmission signal 32. The transmitting device 12 then transmits 110 the precoded transmission signal 32. The receiving device 14 receives 112 the precoded transmission signal 32.

As shown in FIG. 4, the transmitting device 12 may also transmit 120 a sounding signal (e.g., an uplink pilot signal). Prior to transmitting the sounding signal, it is determined whether the first signal or the second signal are a stronger signal. This determination may be performed by the circuitry 22 of the transmitting device 12.

When the stronger signal is the first signal, then a sounding signal is transmitted 120 by the first antenna 16a. Alternatively, when the stronger signal is the second signal, the sounding signal is transmitted 120 by the second antenna 16b. By transmitting the sounding signal using the antenna that received the strongest signal, the strength of the signal received by the receiving device 14 may be improved.

The transmitted sounding signal is received 122 with the antenna 18 of the receiving device 14. A broadcast precoding transform is then calculated 124 (e.g., by the circuitry 24 of the receiving device 14) based on the sounding signal received with the antenna 18 of the receiving device 14 and a measured phase for the sounding signal over the range of frequencies of the sounding signal. A precoded broadcast signal is then generated 126 by applying the broadcast precoding transform to a broadcast signal. The precoded broadcast signal is then transmitted 130 from the antenna 18 of the receiving device 14 and received 132 by the transmitting device 12.

Use of the phrase "broadcast" in the "broadcast precoding transform" and "precoded broadcast signal" is not intended to imply that the "precoded broadcast signal" is received by any devices other than the receiving device 14.

Figure 5A:
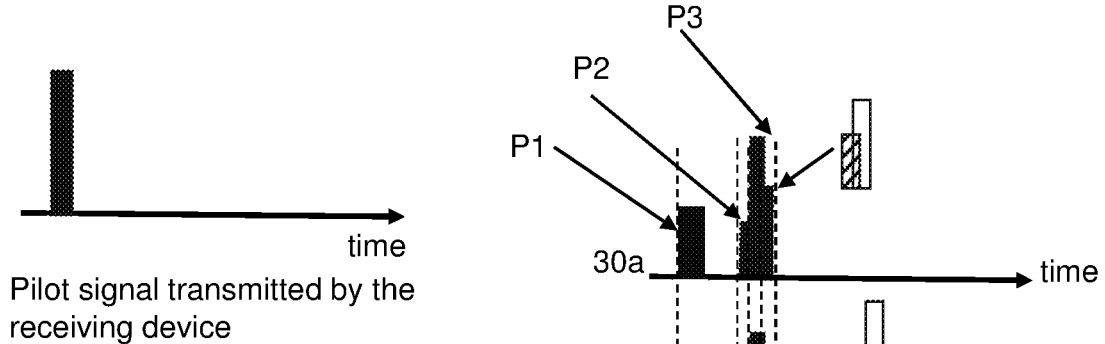
FIG. 5A shows a pilot signal transmitted by the receiving device.

Turning to FIG. 5A, a pilot signal 30 transmitted by the receiving device 14 is shown. In this example (similar to FIG. 1), the pilot signal 30 travels three different paths and is received by the transmitting device 12 (which has three antennas 16 in this example). The pilot signal 30 received by each of the three antennas is shown in FIG. 5B.

Figure 5B:
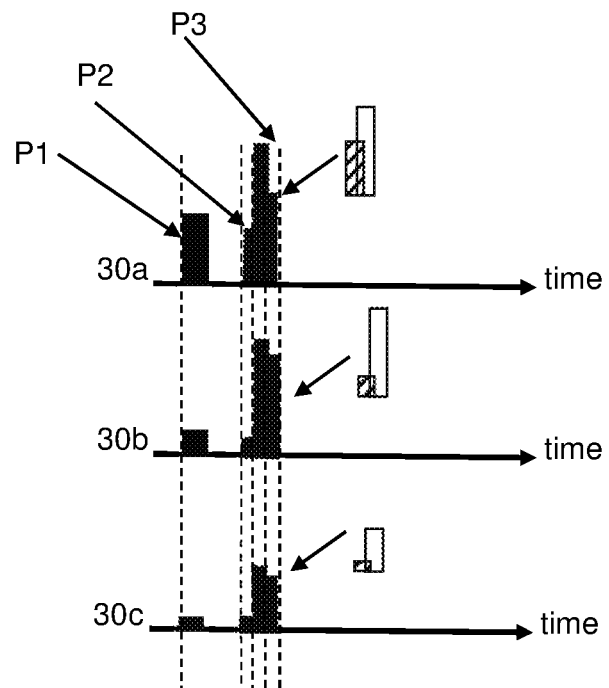
FIG. 5B shows the pilot signal received by the transmitting device.

In FIG. 5B, 30a represents the portion of the pilot signal 30 received by the first antenna 16a, 30b represents the portion of the pilot signal 30 received by the second antenna 16b, and 30c represents the portion of the pilot signal 30 received by the third antenna 16c. The pilot signals 30a-30c received by all three antennas 16a-16c include a first path portion P1, a second path portion P2, and a third path portion P3 were received arrived at different times. As is shown in the figure, the second path portion P2 and the third path portion P3 overlap in time. The second path portion P2 and third path portion P3 arrived with a small enough time delay that caused the two signals to appear as a single overlapping signal. The second path portion P2 and third path portion P3 are individually shown above each pilot signal 30a-30c, with the second path portion P2 shown with diagonal markings and the third path portion P3 shown with a white background.

The method may further include identifying (e.g., by the circuitry 22 of the transmitting device 12) a strongest signal contribution of the received pilot signal 30 and a timing of the strongest signal contribution. At the timing of the strongest signal contribution, a sounding signal ratio may be determined. The sounding signal ratio comprises a ratio between an amplitude of the first signal and an amplitude of the second signal.

The timing of the strongest signal contribution may be found by converting the received pilot signals 30a-30c into power (e.g., squaring the received pilot signals 30a-30c if measured in volts), adding the received pilot signals 30a-30c together and taking the square root of the resulting sum. A peak (i.e., the maximum value) of the resulting signal may then be found. The timing of this peak is the timing of the strongest signal contribution. The sounding signal may then be determined by finding the value (e.g., in volts) of the pilot signals 30a-30c received by each of the three antennas 16a-16c at the timing of the strongest signal contribution. The sounding signal ratio may be determined to be the ratio of these values (i.e., the values of the pilot signals 30a-30c at the strongest signal contribution). For example, the amplitude of each received pilot signal 30a-30c at the timing of the strongest signal contribution may be divided by the sum of the amplitudes of all of the received pilot signals 30a-30c at the timing of the strongest signal contribution. The sounding signal ratio may be used to define the polarization of the sounding signal. For example, when transmitting with the first antenna 16a and second antenna 16b, if the portion of the sounding signal transmitted with the first antenna 16a has the same amplitude as the portion of the sounding signal transmitted with the second antenna 16b, then the sounding signal has a polarization that is equidistant between the polarization of the first antenna 16a and the polarization of the second antenna 16b (e.g., 45 degrees if the first antenna 16a and second antenna 16b are orthogonally polarized).

The method may additionally include generating a first sounding signal and a second sounding signal such that a ratio between an amplitude of the first sounding signal and an amplitude of the second sounding signal corresponds to the determined sounding signal ratio. The method may be performed by the transmitting device 12. The first and second sounding signal may also be generated such that a phase of the first sounding signal is offset to a phase of the second sounding signal by a negative phase difference between the first signal and the second signal at the timing of the strongest signal contribution. The phase of the first sounding signal may be determined using the following equation:

$$\varphi_{S1} - \varphi_{S2} = \varphi_2 - \varphi_1$$

where $\varphi_{S1}$ represents the phase of the first sounding signal, $\varphi_{S2}$ represents the phase of the second sounding signal, $\varphi_1$ represents the first phase, and $\varphi_2$ represents the second phase.

The method may further include transmitting (e.g., by the transmitting device 12) the first sounding signal using the first antenna and transmitting the second sounding signal using the second antenna.

Figure 5C:
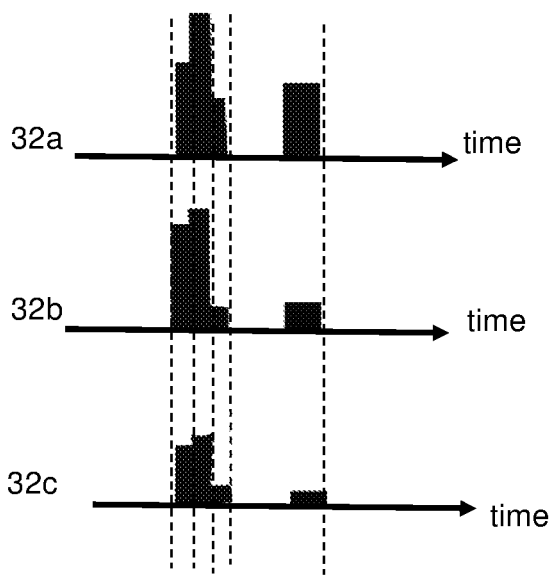
FIG. 5C shows the transmitted precoded signal.

Turning to FIG. 5C, an exemplary transmitted precoded signal 32a-32c is shown. The transmitted precoded signal is shown for each of the corresponding antennas 16a-16c of the transmitting device 12.

As will be understood by one of ordinary skill in the art, the transmitting device 12 and receiving device 14 may be any device capable of sending and/or receiving wireless communication signals. For example, the transmitting device 12 and/or receiving device 14 may comprise a Radio Access Network (RAN) node, such as a base station (e.g., eNodeB, eNB, etc.) and/or another network node, a wireless communications device, such as a mobile device, a cellular phone, a terminal, M2M device, D2D device, tablet, computer, etc.

The system 10 may implement the 3GPP LTE architecture, sometimes referred to as evolved packet system (EPS). This, however, is for exemplary purposes only. For example the system may implement the 5G NR (new radio) standard or WIFI standard. In particular, the receiving device 14 may comprise a user equipment (UE) and the transmitting device 12 may comprise a base station (BS) (e.g., operating according to the 3GPP LTE radio access technology). Similar techniques can be readily applied to various kinds of 3GPP-specified RATs, such as Global Systems for Mobile Communications (GSM), Wideband Code Division Multiplex (WCDMA), General Packet Radio Service (GPRS), Enhanced Data Rates for GSM Evolution (EDGE), Enhanced GPRS (EGPRS), Universal Mobile Telecommunications System (UMTS), and High Speed Packet Access (HSPA), and corresponding architectures of associated cellular networks. A further particular examples is 3GPP MTC. Other examples include other types of wireless communications, e.g., Institute of Electrical and Electronics Engineers (IEEE) 802.11X Wireless Local Area Network, Bluetooth or Zigbee.

Both the transmitting device 12 and the receiving device 14 may include circuitry 22, 24, a non-transitory computer readable medium (memory) 23, 26, and a network interface 25, 27. As described above, the circuitry 22, 24 may be described in this disclosure based on the performed function (e.g., determining circuitry 22a). The different forms of circuitry 22, 24 described may be performed by the same circuitry (e.g., the same processor) or using different circuitry (e.g., at least two different processors).

As will be understood by one of ordinary skill in the art, the circuitry may have various implementations. For example, the circuitry may include any suitable device, such as a programmable circuit, integrated circuit, memory and I/O circuits, an application specific integrated circuit, microcontroller, complex programmable logic device, other programmable circuits, or the like. The circuitry may also include a non-transitory computer readable medium, such as random access memory (RAM), a read-only memory (ROM), an erasable programmable read-only memory (EPROM or Flash memory), or any other suitable medium. Instructions for performing the method described below may be stored in the non-transitory computer readable medium and executed by the processor. The circuitry may be communicatively coupled to the non-transitory computer readable medium and network interface through a system bus, mother board, or using any other suitable structure known in the art.

As will be understood by one of ordinary skill in the art, the computer readable medium may be, for example, one or more of a buffer, a flash memory, a hard drive, a removable media, a volatile memory, a non-volatile memory, a random access memory (RAM), or other suitable device. In a typical arrangement, the computer readable medium may include a non-volatile memory for long term data storage and a volatile memory that functions as system memory for the circuitry. The computer readable medium 20 may exchange data with the circuitry over a data bus. Accompanying control lines and an address bus between the computer readable medium and the circuitry also may be present. The computer readable medium is considered a non-transitory computer readable medium.

As will be understood by one of ordinary skill in the art, the network interface may comprise a wireless network adaptor, radio, or any suitable device that transmits wireless signals from the antenna 16, 18 of the transmitting device 12 and/or 14 receiving device. The network interface may be communicatively coupled to the computer readable medium, such that the network interface is able to send data stored on the computer readable medium and store received data on the computer readable medium. The network interface may also be communicatively coupled to the circuitry such that the processor is able to control operation of the network interface. The network interface, computer readable medium, and circuitry may be communicatively coupled through a system bus, mother board, or using any other suitable manner as will be understood by one of ordinary skill in the art.

All ranges and ratio limits disclosed in the specification and claims may be combined in any manner. Unless specifically stated otherwise, references to "a," "an," and/or "the" may include one or more than one, and that reference to an item in the singular may also include the item in the plural.

The phrase "and/or" means "either or both" of the elements so conjoined, i.e., elements that are conjunctively present in some cases and disjunctively present in other cases. Other elements may optionally be present other than the elements specifically identified by the "and/or" clause, whether related or unrelated to those elements specifically identified unless clearly indicated to the contrary. Thus, as a non-limiting example, a reference to "A and/or B," when used in conjunction with open-ended language such as "comprising" can refer, in one embodiment, to A without B (optionally including elements other than B); in another embodiment, to B without A (optionally including elements other than A); in yet another embodiment, to both A and B (optionally including other elements); etc.

The word "or" has the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," may refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of."

The phrase "at least one," in reference to a list of one or more elements, means at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

The transitional words or phrases, such as "comprising," "including," "carrying," "having," "containing," "involving," "holding," and the like, are open-ended, i.e., meaning including but not limited to.

Although the invention has been shown and described with respect to a certain embodiment or embodiments, equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

The invention claimed is:

1. A method for encoding wireless communications signals, the method comprising:
   receiving a first signal by receiving a pilot signal with a first antenna;
   receiving a second signal by receiving the pilot signal with a second antenna, wherein the pilot signal comprises:
      a range of frequencies; and
      an initial signal having known properties prior to being transmitted;
   calculating a first precoding transform based on the first signal and a measured first phase for the first signal over the range of frequencies of the pilot signal;
   calculating a second precoding transform based on the second signal and a measured second phase for the second signal over the range of frequencies of the pilot signal;
   generating a first precoded transmission signal by applying the first precoding transform to a transmission signal;
   generating a second precoded transmission signal by applying the second precoding transform to the transmission signal;
   transmitting the first precoded transmission signal from the first antenna;
   transmitting the second precoded transmission signal from the second antenna; and
   wherein the first precoded transmission signal is transmitted with a phase which is offset to a phase of the second precoded transmission signal by a phase difference between the second phase and the first phase.

2. The method of claim 1, wherein the first and second precoding transforms are calculated such that the first and second precoded transmission signals over the range of frequencies of the pilot signal are transmitted in time in a reverse of an order in which the same frequencies of the pilot signal were received, respectively.

3. The method of claim 1, wherein the first and second precoding transforms are calculated using a reverse of a timing that the first signal and the second signal over the range of frequencies of the pilot signal are received.

4. The method of claim 1, wherein a time delay between a transmission of specific frequencies of the precoded transmission signal corresponds to a time delay between the same specific frequencies of the received pilot signal.

5. The method of claim 1, wherein a polarization of the first antenna is essentially orthogonally polarized relative to a polarization of the second antenna.

6. The method of claim 1, further comprising:
   receiving a third signal by receiving the pilot signal with a third antenna;
   calculating a third precoding transform based on the third signal and a measured third phase for the third signal over the range of frequencies of the pilot signal;
   generating a third precoded transmission signal by applying the third precoding transform to the transmission signal;
   transmitting the third precoded transmission signal from the third antenna; and
   wherein the third precoded transmission signal is transmitted with a phase which is offset to:
      a phase of the first precoded transmission signal by a negative phase difference between the third phase and the first phase; and
      the phase of the second precoded transmission signal by a negative phase difference between the third phase and the second phase.

7. The method of claim 1, wherein the pilot signal comprises an approximated signal shape of a known signal shape, the method further comprising:
   determining the approximated signal shape based on available bandwidth for the pilot signal, wherein the available bandwidth is not contiguous.

8. The method of claim 1, further comprising:
   determining which of the first signal and the second signal are a stronger signal;
   when the stronger signal is the first signal, transmitting a sounding signal by the first antenna;
   when the stronger signal is the second signal, transmitting the sounding signal by the second antenna;
   receiving the transmitted sounding signal with an antenna of a receiving device;
   calculating a broadcast precoding transform based on the sounding signal received with the antenna of the receiving device and a measured phase for the sounding signal over the range of frequencies of the sounding signal;
   generating a precoded broadcast signal by applying the broadcast precoding transform to a broadcast signal;
   transmitting the precoded broadcast signal from the antenna of the receiving device.

9. The method of claim 1, the method further comprises:
   identifying a strongest signal contribution of the received pilot signal and a timing of the strongest signal contribution;
   determining a sounding signal ratio comprising a ratio between an amplitude of the first signal and an amplitude of the second signal at the timing of the strongest signal contribution;
   generating a first sounding signal and a second sounding signal such that:
      a ratio between an amplitude of the first sounding signal and an amplitude of the second sounding signal corresponds to the determined sounding signal ratio; and a phase of the first sounding signal is offset to a phase of the second sounding signal by a negative phase difference between the first signal and the second signal at the timing of the strongest signal contribution; and transmitting the first sounding signal using the first antenna and transmitting the second sounding signal using the second antenna.

10. A transmitting device configured to transmit encoded wireless communications signals, the transmitting device comprising:

a first antenna configured to receive a first signal by receiving a pilot signal;

a second antenna configured to receive a second signal by receiving the pilot signal, wherein the pilot signal comprises:

a range of frequencies; and an initial signal having known properties prior to being transmitted; and circuitry configured to:

calculate a first precoding transform based on the first signal and a measured first phase for the first signal over the range of frequencies of the pilot signal;

calculate a second precoding transform based on the second signal and a measured second phase for the second signal over the range of frequencies of the pilot signal;

generate a first precoded transmission signal by applying the first precoding transform to a transmission signal;

generate a second precoded transmission signal by applying the second precoding transform to the transmission signal;

cause the first antenna to transmit the first precoded transmission signal; and cause the second antenna to transmit the second precoded transmission signal; and wherein the first precoded transmission signal is transmitted with a phase which is offset to a phase of the second precoded transmission signal by a phase difference between the second phase and the first phase.

11. The transmitting device of claim 10, wherein the first and second precoding transforms are calculated such that the first and second precoded transmission signals over the range of frequencies of the pilot signal are transmitted in time in a reverse of an order in which the same frequencies of the pilot signal were received, respectively.

12. The transmitting device of claim 10, wherein the first and second precoding transforms are calculated using a reverse of a timing that the first signal and the second signal over the range of frequencies of the pilot signal are received.

13. The transmitting device of claim 10, wherein a time delay between a transmission of specific frequencies of the precoded transmission signal corresponds to a time delay between the same specific frequencies of the received pilot signal.

14. The transmitting device of claim 10, wherein a polarization of the first antenna is essentially orthogonally polarized relative to a polarization of the second antenna.

15. The transmitting device of claim 10, further comprising a third antenna configured to receive a third signal by receiving the pilot signal, wherein:

the circuitry is further configured to:

calculate a third precoding transform based on the third signal and a measured third phase for the third signal over the range of frequencies of the pilot signal;

generate a third precoded transmission signal by applying the third precoding transform to the transmission signal; and cause the third antenna to transmit the third precoded transmission signal;

wherein the third precoded transmission signal is transmitted with a phase which is offset to:

a phase of the first precoded transmission signal by a negative phase difference between the third phase and the first phase; and the phase of the second precoded transmission signal by a negative phase difference between the third phase and the second phase.

* * * * *